Patented Apr. 28, 1953

2,636,895

UNITED STATES PATENT OFFICE 2,636,895

METHOD FOR PREPARING ORGANOHALO-GENOSILANES

Warren L. Walton, Schenectady, N. Y., assignor to General Electric Company, a corporation of New York No Drawing. Application August 18, 1949, Serial No. 111,088

20 Claims. (Cl. 260—448.2)

This invention relates to the preparation of organohalogenosilanes useful as intermediates in the preparation of silicone oils, resins, rubbers, etc. More particularly, it is concerned with a process for preparing such compounds which comprises effecting reaction in the presence of a Friedel-Craft type catalyst selected from the class consisting of aluminum halides, boron halides and zinc halides, and mixtures thereof, between (1) a hydrocarbon and (2) a polysilane containing a Si-Si linkage to which is attached at least one silicon-bonded halogen.

It has been disclosed in U. S. Patent 2,379,821, Miller et al., issued July 3, 1945, that organohalogenosilanes may be prepared by effecting reaction between a hydrocarbon and an inorganic silicon halide in the vapor phase at a temperature of at least 450° C. As examples of an inorganic silicon halide, the patentees have listed inorganic polysilicon halides as, for example, $Si_2I_6$, $Si_3Cl_8$, etc. According to the disclosures and teachings in this patent, the reaction between the hydrocarbon and the inorganic silicon halide proceeds by means of a splitting off of a hydrogen from the hydrocarbon and a halogen from the inorganic silicon halide to form a hydrogen halide and an organohalogenosilane containing a silicon-bonded hydrocarbon radical. Thus, from the disclosures and teachings in this patent it would follow that the reaction of, for example, benzene with hexachlorodisilane would give phenylpentachlorodisilane and as a by-product, hydrogen chloride.

Moreover, using the method impliedly taught by Miller et al. with regard to the use of polysilanes, it was found that even at temperatures as high as 500° C., the reaction is very slow and produces unsatisfactory yields together with large amounts of undesirable solid, red by-products.

I have now discovered that contrary to the teachings and disclosures in the aforementioned Miller et al. patent, if one employs a Friedel-Crafts type catalyst in the course of the reaction, certain unexpected and unobvious results are obtained. More particularly, as a result of reacting an organic hydrocarbon with a polysilane containing a silicon-bonded halogen atom in the presence of a Friedel-Crafts type catalyst, splitting of the silicon-to-silicon bond is effected with loss of a hydrogen from the organic hydrocarbon to form a monomeric organohalogenosilane.

I have also found that the employment of Friedel-Crafts type catalysts accelerates markedly the formation of the organohalogenosilanes in my claimed reaction as compared to the reaction of organic hydrocarbons with the polysilanes in the absence of such catalysts. In addition, when employing disilanes, I do not obtain any red, solid by-products when applying the preferred conditions, i. e., using pressure conditions, in my claimed reaction as would be obtained under the same conditions but in the absence of the Friedel-Crafts type catalyst. As a matter of fact, I am able to carry out the reaction under conditions such that scarcely any kind of solid product is present in the reacting mixture. When polysilanes containing more than two silicon atoms in the molecule are used, the formation of solid red by-products can be minimized or eliminated by using, e. g., preformed $SiCl_4$, together with pressure and the aforementioned catalysts. Such results were entirely unpredictable and in no way could have been anticipated from the disclosures and teachings in the aforementioned Miller et al. patent.

In accordance with my invention, an organic hydrocarbon is reacted with a polysilane of the type described above in the presence of a Friedel-Crafts type catalyst of the class stated above, as, for instance, aluminum halides, e. g., aluminum trichloride, aluminum tribromide, etc.; boron halides, e. g., boron trichloride, boron trifluoride, boron trifluoride etherate; zinc halides, e. g., zinc chloride, zinc fluoride, etc. Iron halides, unexpectedly have been found ineffective in my claimed invention. The amount of catalyst which may be employed may be varied within wide limits without departing from the scope of the invention. Generally, too large amounts of catalyst should be avoided since they tend to decrease the yield of the organohalogenosilanes. I prefer to use a minor amount of catalyst, for instance from 0.1 to 15 per cent, preferably from 0.5 to 10 per cent, by weight, of the catalyst based on the weight of the polysilane. The actual amount of catalyst employed will depend on such factors as the temperature used, the type of reactants present in the reaction mixture, the time of contact between the catalyst and the reactants, etc.

Among the organic hydrocarbons which may be employed in the practice of my invention may be mentioned the aliphatic hydrocarbons such as, for example, saturated aliphatic hydrocarbons (e. g., methane, ethane, propane, butane, isobutane, pentane, 2-ethylhexane, decane, etc.), unsaturated aliphatic hydrocarbons (e. g., ethylene, propylene, octene-1, butadiene, acetylene, etc.), saturated and unsaturated cycloaliphatic compounds (e. g., cyclopentane, cyclohexane, cyclopentene, cyclohexene, cyclopentadiene, etc.), hydrocarbon-substituted aromatic compounds (e. g., toluene, xylene, ethylbenzene, di-isopropylbenzene, styrene, biphenyl, etc.), aromatic hydrocarbons (e. g., benzene, naphthalene, anthracene, etc.), and other classes of hydrocarbons (e. g., alpha terpinene, pinene, p-menthane, p-menthene, dipentene, etc.). It will be apparent from the foregoing many examples that the organic hydrocarbons which may be employed in the practice of my invention embrace both saturated and unsaturated, cyclic and acyclic, straight-chained and branched-chained, aliphatic, aromatic, and mixed aromatic aliphatic hydrocarbons, and mixtures thereof. If desired other compounds such as thiophene may be employed in the practice of the present invention. Preferably, I employ an aromatic hydrocarbon in my claimed reaction.

The polysilanes employed in the practice of the instant claimed invention may comprise any of the many polysilanes containing at least one silicon-to-silicon linkage wherein the silicon atoms in the polysilane may have attached thereto, in adition at least one halogen atom (for example, chlorine, bromine, fluorine, etc.), other inorganic and organic substituents as, for instance, other halogen atoms, hydrogen atoms, organic radicals, etc. The organic substituents therein may comprise, for instance, any one of the many organic hydrocarbon radicals, for instance, saturated and unsaturated aliphatic radicals, aromatic radicals, hydrocarbon-substituted aromatic radicals, aromatic-substituted aliphatic radicals, cycloaliphatic radicals, etc., corresponding to the organic hydrocarbons described previously.

My invention is particularly applicable to the treatment of purely inorganic halogenopolysilanes, or individual compounds and mixtures of such individual compounds corresponding to the general formula $Si_2X_n(R)_{6-n}$ where R is a monovalent hydrocarbon radical (for instance, an alkyl, aryl, alkaryl, aralkyl, etc., radical), X is a halogen (for instance, chlorine, bromine, fluorine, etc.), and $n$ is a value equal to one of the following: 1, 2, 3, 4, 5, 6, for instance, from 2 to 5, inclusive. Included within such general formula are compounds such as, for example hexachlorodisilane, hexabromodisilane, dimethyltetrafluorodisilane, dimethyltetrachlorodisilane, methylpentachlorodisilane, etc., such as are obtained during the passage of a hydrocarbon halide over heated silicon, preferably in the presence of a catalyst, in accordance with the disclosures and teachings in Rochow patent United States 2,380,995, issued August 7, 1945, and assigned to the same assignee as the present invention. In addition to the usual organohalogenosilanes obtained, mixtures of organohalogenodisilanes corresponding to the above formula are also obtained. These high boiling organohalogenosilanes have been up to the present time of limited value, their greatest importance being for use as a primer coating for treating various surfaces to reduce their adhesion to ice as is more particularly disclosed and claimed in the co-pending application of Robert Smith-Johannsen, Serial No. 56,673, now Patent No. 2,575,141, filed October 26, 1948, and assigned to the same assignee as the present invention.

When methyl chloride is passed over heated silicon in the presence of a copper catalyst in a manner disclosed in the aforementioned Rochow patent, there is usually obtained a fraction comprised essentially of a mixture of compounds embraced by the aforementioned formula where R is a methyl group. This mixture of compounds comprises a high boiling residue (the bulk of this residue boiling from about 125° to 160° C.) and comprises large amounts of dimethyltetrachlorodisilane (including its various isomers such as, for instance, 2,2-dimethyl-1,1,1,2-tetrachlorodisilane, 1,2 - dimethyl - 1,1,2,2-tetrachlorodisilane, etc.) and trimethyltrichlorodisilane (including its various isomers), as well as small amounts of hexachlorodisilane, methylpentachlorodisilane, and tetramethyldichlorodisilane (including its isomers). Because all the foregoing organodisilanes have found only limited use, attempts have been made to treat these materials in some way so as to produce products having a greater utility.

In accordance with my claimed method, I have unexpectedly found that if any of the foregoing halogenopolysilanes or organohalogenopolysilanes, particularly the methylchlorodisilanes or purely inorganic polysilanes consisting of silicon and chlorine, are reacted in the presence of a Friedel-Crafts type catalyst of the class mentioned above with an organic hydrocarbon, I am able to isolate in good yields individual organohalogenosilanes free of silicon-to-silicon bonds. These so-called "monomeric" organohalogenosilanes can again be employed for making organopolysiloxanes, i. e., silicone resins, rubbers, oils, etc., by the usual methods employed for producing such compositions of matter.

I have also discovered unexpectedly that improvement in many instances can be realized if the reaction between the organic hydrocarbon and the polysilane is conducted in the presence of $SiCl_4$. More specifically, it was found that in the reaction between benzene and a choloropolysilane (e. g., $Si_4Cl_{10}$, $Si_5Cl_{12}$), the presence of $SiCl_4$ increased the yield of the $C_6H_5SiCl_3$ markedly. In addition, the presence of the $SiCl_4$ prevented the formation of red solid by-products when halogenopolysilanes containing more than two silicon atoms were employed.

The amount of $SiCl_4$ which can be used, especially with halogenopolysilanes containing more than two silicon atoms, may be varied within wide limits. I have found it advantageous to use an amount of $SiCl_4$ which will bring the average chlorine content of all chlorosilanes present (including the chloropolysilanes and the $SiCl_4$) up to approximately that present in $Si_2Cl_6$. Two considerations in the use of $SiCl_4$ involve the repression of the formation of $SiCl_4$ during my claimed reaction, and the production of different chlorosilanes in accordance with reactions exemplified by the following general equations showing the formation of $S_2Cl_6$ from different classes of higher chloropolysilanes (1)    $Si_nCl_{2n+2} + (n-2)SiCl_4 \rightarrow (n-1)Si_2Cl_6$
(2)    $Si_nCl_{2n} + nSiCl_4 \rightarrow nSi_2Cl_6$ where $n$ is an integer greater than 2. Generally, in the case where halogenopolysilanes containing at least three silicon atoms are employed, I have found that I may advantageously use at least about 40 per cent $SiCl_4$, based on the weight of the halogenopolysilane. With increasing silicon content the amount of $SiCl_4$ used will also increase.

I have also found that improved yields of organo-halogenosilanes, for instance, phenylchlorosilanes, can be obtained after the first reaction between the organic hydrocarbon and the halogenopolysilane has taken place. More specifically, I have discovered that if, after reacting the organic hydrocarbon with the polysilane, the desired organohalogenomonosilanes are removed from the final reaction product and the remainder itself is reacted, or an additional amount of hydrocarbon and polysilane equivalent to that removed as the organohalogenomonosilane is added to the remaining reaction mixture, and this mixture in turn reacted, additional yields of desired product can be obtained. When new reactants are added to the aforementioned remainder of reacted and unreacted materials, it is possible to obtain a better yield based on the newly added reactants than was originally obtained. When no new materials are added, some of the desired product is obtained, thus increasing the yield of organohalogenosilanes from the original reactants.

It has been noted that when reaction is effected between, e. g., 4 mols benzene and 1 mol $Si_2Cl_6$, $C_6H_5SiCl_3$ is formed, and no detectable amounts of unreacted $Si_2Cl_6$ are present in the reaction products. Instead, there is present a high boiling liquid residue which can be mixed with the low boiling materials, such as benzene, $SiCl_4$, etc., to again give $C_6H_5SiCl_3$.

The reaction is advantageously conducted at temperatures of the order of from about 250° to below the decomposition point of the organic hydrocarbon. One of the added advantages I have found in using the Friedel-Crafts type catalyst mentioned previously is that lower temperatures of reaction are permitted than can be used in the reaction disclosed and claimed in the aforementioned Miller et al. patent. Generally, I have found that temperatures of the order of from 250° to 700° C., preferably from 300° to 600° C., are satisfactory.

Any one of many suitable methods may be used in carrying out the invention. Although normal pressures may be used, I prefer to use superatmospheric, e. g., the autogenous pressure generated by the reaction mixture at the temperature of the reaction. One method comprises charging the reactants, i. e., the organic hydrocarbon and the polysilane, to a pressure reactor together with the catalyst and heating the mixture under pressure at elevated temperatures within the range described previously for a time sufficient to cause the reaction to go substantially to completion. Under such conditions the time of heating the mixture under pressure may range from 15 seconds to 8 or more hours, for example, from about 0.25 to 1 hour or more, depending upon the type of reactants, the catalyst, the temperature, etc. It is believed that, since an equilibrium composition is being approached, the bulk of the pressure reaction is completed in a relatively short period of time and that continued heating under pressure merely insures that the ultimate point of completion of the reaction has been closely approached.

The ratio of the halogenopolysilane to the organic hydrocarbon may be varied within wide limits. Generally I have found it advisable for economical purposes and for the purpose of effecting a more complete reaction between the reactants to use at least a slight molar excess of the organic hydrocarbon, for instance, from 1.05 to 6 or more mols, preferably from 1.25 to 4 mols of the latter per mol of Si-Si bond in the polysilane.

In order that those skilled in the art may better understand how the present invention may be practiced, the following examples are given by way of illustration and not by way of limitation. All parts are by weight.

Example 1

In a steel pressure vessel of such a size that the total charge density was 0.225 gram/ml., were charged 156 parts benzene, 134.7 parts hexachlorodisilane ($Si_2Cl_6$) and 2 parts aluminum chloride. The reactor was closed and the mixture heated at about 400° C. for 4 hours during which time an autogenous pressure of 1090 p. s. i. was reached. The reactor was cooled and about 4 parts sodium chloride was added and the bomb sealed and reheated for one hour at 250° C. to remove the aluminum chloride from the reaction mixture in the form of a complex thereof. After cooling the reactor again, the product was removed and filtered. Fractional distillation and analysis of the liquid product showed 97.2 parts phenyltrichlorosilane were obtained. This quantity of $C_6H_5SiCl_3$ is a 46 per cent yield based on the silicon charged in the form of chloropolysilane which appeared in the reaction product as $C_6H_5SiCl_3$. (Thus 27.9 parts of silicon in $Si_2Cl_6$ gave 46 per cent of 27.9 or 12.9 parts of silicon in $C_6H_5SiCl_3$). Unreacted benzene together with varying amounts of $SiHCl_3$ and $SiCl_4$ were also obtained as a result of this distillation.

Example 2

The following materials were charged to the aforementioned steel pressure reactors described in Example 1, using a total charge density of 0.210 gram/ml.:

114.4 parts of a reaction mixture boiling between 150–160° C. and comprising methylchlorodisilanes described previously as being obtained as a high-boiling residue from the reaction between methyl chloride and heated silicon in the presence of copper as a catalyst.
156.3 parts benzene
2.0 parts anhydrous $AlCl_3$ The pressure reactor was closed and the mixture heated at 400° C. for 4 hours. Thereafter, the pressure reactor was cooled and about 4 parts sodium chloride added for the same purpose as described above, i. e., to form a complex of aluminum chloride, the reactor closed and heated at 250° C. for an additional hour to complete the formation of the aluminum chloride complex. Distillation and analysis of the liquid portion of the reaction product showed that substantial amounts of phenyltrichlorosilane and methyl phenyldichlorosilane were present in the reaction mixture.

Example 3

In this example, runs were conducted in which the reagent mixture used consisted of, by weight, 44.7 per cent $Si_2Cl_6$, 53.3 per cent $C_6H_6$ (four mols $C_6H_6$) and 2.0 per cent $BCl_3$. In one set of conditions the time for reaction was varied while under another set of conditions the temperature was varied in order to determine the effect of these two variables. In each case the reaction bombs in which the ingredients were loaded were filled so that essentially equal pressures were present in all cases. The exact method involved heating the charge enclosed in a sealed glass tube for the stipulated period of time while the bath was heated at the desired temperature. In Table I where the time of heating was varied, the temperature was maintained essentially around 400° C. In Table II when the temperature was varied, the time of heating was about 9.6 minutes.

TABLE I

| Sample No. | Time | Loading Density, g./ml. | Yield $C_6H_5SiCl$ (Based on total Si Contained in starting $Si_2Cl_6$), percent |
|---|---|---|---|
| 1 | 9.6 minutes | 0.142 | 13 |
| 2 | 58 minutes | 0.141 | 24 |
| 3 | 20 hours | 0.150 | 38 |

TABLE II

| Sample No. | Temperature, °C. | Loading Density, g./ml. | Yield $C_6H_5SiCl_3$ (Based on total Si), percent |
|---|---|---|---|
| 4 | 400 | 0.142 | 13 |
| 5 | 450 | 0.132 | 24 |
| 6 | 500 | 0.124 | 33 |

Example 4

In this example the effect of loading density on the reaction between benzene $SiCl_6$ and $BCl_3$ was determined using the ratio of ingredients employed in Example 3. The time of heating was 58 minutes and the temperature at which all the runs were conducted was about 400° C. These tests establish that the equilibrium relationship is attained within 58 minutes at 400° C. at a loading density of about 0.365 gram/ml. or above.

TABLE III

| Sample No. | Loading Density, g./ml. | Calculated Pressure in Atmospheres [1] | Yields (Based on total Si), percent |
|---|---|---|---|
| 7 | 0.144 | 68 | 26 |
| 8 | 0.365 | 172 | 47 |
| 9 | 0.552 | 260 | 46 |

[1] Due to variations from the perfect gas laws, these values are higher than the actual pressures present.

Example 5

In this example the following hydrocarbons were heated with $Si_2Cl_6$ in the presence of $BCl_3$ as a catalyst under pressure for the stipulated time and at the designated temperature to obtain good yields of organohalogenosilanes.

TABLE IV

| Sample No. | Hydrocarbon | Ratio, Mols Hydrocarbon–Mols $Si_2Cl_6$ | $BCl_3$ Used, percent | Time, hours | Temperature, °C. | Percent Yield |
|---|---|---|---|---|---|---|
| 10 [a] | Methane | 2.2 | 4.5 | 17 | 450 | 30 |
| 11 [b] | Cyclohexane | 3.94 | 1.3 | 46 | 400 | 28 |
| 12 [c] | Toluene | 3.0 | 7.4 | 1 | 400 | 31 |
| 13 [d] | Thiophene | 4.0 | 1.0 | 1 | 400 | 19 |

[a] In this run the pressure is calculated to be about 70 atmospheres. Of the methyl chlorosilanes found in the reaction product, the predominant proportion consisted of $CH_3SiCl_3$.

[b] As a result of this reaction, there is obtained cyclohexyltrichlorosilane ($C_6H_{11}SiCl_3$) having a boiling point of 84–86° C./15 mm. This compound was found to contain 50.2 percent hydrolyzable chlorine (theoretical 49.3 percent). The loading density was 0.328 g./ml.

[c] The fraction of the reaction product having a boiling point between 170–250° C. was hydrolyzed to give a resin which on analysis was shown to comprise approximately 86 percent of the theoretical for isomers of $CH_3C_6H_4SiCl_3$. The loading density was 0.577 g./ml.

[d] The majority of the product obtained comprised $C_4H_3SiCl_3$ boiling at 86–89° C./24 mm. The loading density was 0.432 g./ml.

Example 6

This example shows the effect of using $SiCl_4$ in the reaction between the organic hydrocarbon, specifically benzene, and the chloropolysilane. The chloropolysilanes employed were of higher molecular weight than $Si_2Cl_6$. All the tests were conducted under pressure for one hour at 400° C. When $SiCl_4$ was omitted, a red solid was formed.

TABLE V

| Sample No. | Chloropolysilane | Percent | Additive | Percent | Percent $C_6H_6$ | Percent $BCl_3$ | Loading Density, grams/ml. | Yield $C_6H_5SiCl_3$, percent |
|---|---|---|---|---|---|---|---|---|
| 14 | $Si_{4.5}$* | 45.5 | None | | 51.4 | 3.1 | 0.450 | 35 |
| 15 | $Si_{4.5}$* | 33.01 | $SiCl_4$ | 27.2 | 37.6 | 2.25 | 0.494 | 57 |
| 16 | $Si_5$* | 47.2 | None | | 49.8 | 3.0 | 0.300 | 26 |
| 17 | $Si_5$* | 23.8 | $SiCl_4$ | 20.7 | 52.4 | 3.1 | 0.523 | 53 |
| 18 | $Si_3Cl_8$ | 39.1 | $SiCl_4$ | 26.9 | 32.1 | 1.9 | 0.548 | 53 |

*Mixtures of chloropolysilanes having an average of the stipulated number of silicons in the mixture.

In calculating the per cents yield it is arbitrarily assumed that 100 per cent of the silicon in the chloropolysilane is the maximum that can be converted to the desired $C_6H_5SiCl_3$. It is conceivable that silicon from $SiCl_4$ is also converted to $C_6H_5SiCl_3$ in accordance with the equations disclosed earlier (supra).

Example 7

In this example a mixture of chloropolysilanes containing an average of five silicon atoms in the polysilane molecule was heated under pressure with benzene in the presence of an additive comprising SiCl₄ and a catalyst of BCl₃. The per cents of the ingredients were as follows:

|  | Per cent |
|---|---|
| Chloropolysilane | 23.8 |
| SiCl₄ | 20.7 |
| Benzene | 52.4 |
| BCl₃ | 3.1 |

The heating was conducted in a closed glass bomb under pressure at a loading density of 0.52 gram/ml. for one hour at 400° C. There was thus obtained a yield of 60 per cent C₆H₅SiCl₃ based on the silicon as above explained in Example 6. The C₆H₅SiCl₃ was removed by distillation and the residue, including the high boilers and the low boilers, were recombined and heated again under pressure at a loading density of 0.527 gram/ml. for one hour at 400° C. to give an additional 14 per cent C₆H₅SiCl₃ cut in the products. This corresponds to a further yield of about 23 per cent on the original material.

*Example 8*

A mixture comprising by weight 44.7 per cent Si₂Cl₆, 53.3 per cent C₆H₆, and 2.0 per cent BCl₃ was charged to a pressure reactor at a loading density of 0.523 and thereafter heated for one hour at 400° C. The liquid products were distilled to remove C₆H₅SiCl₃ in an amount equal to 32 per cent of the reaction product corresponding to a yield of 45 per cent C₆H₅SiCl₃.

The total liquid reaction products, exclusive of the C₆H₅SiCl₃ cut, were recombined and a quantity of benzene and Si₂Cl₆, in a molar ratio of 2:1 equivalent to the C₆H₅SiCl₃ removed, was added, and the total mixture heated at 400° C. for one hour at a loading density of about 0.474 gram/ml. From this reaction was obtained by fractional distillation of the reaction product a cut of C₆H₅SiCl₃ which was 26 per cent of the reaction product or 70 per cent yield based on the added benzene and Si₂Cl₆ under the new conditions.

*Example 9*

Into a pressure vessel were charged a mixture of ingredients comprising, by weight, 58 per cent Si₂Cl₆, 39 per cent cyclohexene, and 3 per cent BCl₃. The pressure reactor was closed and heated for 30 minutes at 400° C. at a loading density of 0.502 gram/ml. The pressure reactor was cooled and the reaction product removed and distilled through a fractional distillation column to give a fraction boiling above 205° C. (36 per cent of the total weight of the product). This fraction was hydrolyzed in ether, washed with water and filtered to remove any ether insoluble materials. Evaporation of the ether left a brown resin, which upon analysis showed it to be an organopolysiloxane resin having carbon-silicon bonds.

It will, of course, be apparent to those skilled in the art that other organic hydrocarbons, as well as other polysilanes, many examples of which have been given previously, may be employed in addition to the reactants used in the foregoing examples without departing from the scope of the present invention. In addition, any one of the other previously enumerated Friedel-Crafts type catalyst, as well as conditions of reaction, may also be used. In general, caution should be exercised in maintaining substantially anhydrous conditions during the course of the reaction in order to eliminate undesirable hydrolysis of either the polysilane or the formed organohalogenosilane. In addition, other polysilanes, particularly inorganic halogenopolysilanes and organohalogenopolysilanes, having more than 2 (e. g. 6 to 10 or more) adjacent silicon atoms and containing the structural unit Si-Si may also be employed without departing from the scope of the claimed invention. Such materials include octachlorotrisilane, tetramethyltetrachlorotrisilane, heptaphenylchlorotrisilane, Si₁₀Cl₂₀H₂, Si₁₀Cl₂₂, etc.

Other halogenodisilanes or mixtures thereof corresponding to the above-identified general formula Si₂X$_n$(R)$_{6-n}$ may also be used where R is any monovalent organic radical, for example, an alkyl radical (for instance, methyl, ethyl, propyl, butyl, isobutyl, amyl, decyl, etc.), aryl radical (for instance, phenyl, naphthyl, anthracyl, etc.), alkaryl radical (for instance, tolyl, xylyl, etc.), aralkyl radical (for instance, benzyl, phenylethyl, etc.), other saturated and unsaturated aliphatic and cycloaliphatic radicals (for instance, vinyl, allyl, butadienyl, propinyl, cyclohexanyl, cyclohexenyl, cyclopentanyl, etc.), radicals and X and $n$ have the meanings given above.

What I claim as new and desire to secure by Letters Patent of the United States, is:

1. The process for making hydrocarbon-substituted halogenomonosilanes which comprises heating in the presence of a Friedel-Crafts type catalyst selected from the class consisting of halides of aluminum, boron, and zinc a mixture of ingredients comprising (1) a hydrocarbon and (2) a polysilane containing a silicon-bonded halogen atom and being of the type R$_{(2n+2)}$Si$_n$ in which $n$ has a value of at least 2 and R is selected from the group consisting of halogen atoms and hydrocarbon radicals.

2. The process for making aromatic hydrocarbon-substituted halogenomonosilanes which comprises heating in the presence of a Friedel-Crafts type catalyst selected from the class consisting of halides of aluminum, boron, and zinc a mixture of ingredients comprising (1) an aromatic hydrocarbon and (2) a polysilane containing a silicon-bonded halogen atom and being of the type R$_{(2n+2)}$Si$_n$ in which $n$ has a value of at least 2 and R is selected from the group consisting of halogen atoms and hydrocarbon radicals.

3. The process for making aliphatic hydrocarbon-substituted halogenosilanes which comprises heating in the presence of a Friedel-Crafts type catalyst selected from the class consisting of halides of aluminum, boron, and zinc a mixture of ingredients comprising (1) an aliphatic hydrocarbon and (2) a polysilane containing a silicon-bonded halogen atom and being of the type R$_{(2n+2)}$Si$_n$ in which $n$ has a value of at least 2 and R is selected from the group consisting of halogen atoms and hydrocarbon radicals.

4. The process for making phenyl halogenosilanes which comprises heating in the presence of a Friedel-Crafts type catalyst selected from the class consisting of halides of aluminum, boron, and zinc a mixture of ingredients comprising (1) benzene and (2) a polysilane containing a silicon-bonded halogen atom and being of the type R$_{(2n+2)}$Si$_n$ in which $n$ has a value of at least 2 and R is selected from the group consisting of halogen atoms and hydrocarbon radicals.

5. The process for making methyl halogenosilanes which comprises heating in the presence of a Friedel-Crafts type catalyst selected from the class consisting of halides of aluminum, boron, and zinc a mixture of ingredients comprising (1) methane and (2) a polysilane containing a silicon-bonded halogen atom and being of the type $R_{(2n+2)}Si_n$ in which $n$ has a value of at least 2 and R is selected from the group consisting of halogen atoms and hydrocarbon radicals.

6. The process for making hydrocarbon-substituted chloromonosilanes which comprises heating in the presence of a Friedel-Crafts type catalyst selected from the class consisting of halides of aluminum, boron, and zinc a mixture of ingredients comprising (1) a hydrocarbon and (2) hexachlorodisilane.

7. The process for preparing hydrocarbon-substituted halogenomonosilanes which comprises heating in the presence of a Friedel-Crafts type catalyst selected from the class consisting of halides of aluminum, boron, and zinc a mixture of ingredients comprising (1) a hydrocarbon and (2) a mixture of hydrocarbon-substituted halogenodisilanes.

8. The process for preparing phenylchlorosilanes which comprises heating in the presence of a Friedel-Crafts type catalyst selected from the class consisting of halides of aluminum, boron, and zinc a mixture of ingredients comprising (1) benzene and (2) hexachlorodisilane.

9. The process for preparing methylchlorosilanes which comprises heating in the presence of a Friedel-Crafts type catalyst selected from the class consisting of halides of aluminum, boron, and zinc a mixture of ingredients comprising (1) methane and (2) hexachlorodisilane.

10. The process for preparing phenylchlorosilanes which comprises heating in the presence of a Friedel Crafts type catalyst selected from the class consisting of halides of aluminum, boron, and zinc a mixture of ingredients comprising (1) benzene and (2) a mixture of organohalogenodisilanes corresponding to the general formula $Si_2X_n(R)_{6-n}$ where R is a monovalent hydrocarbon radical, X is a halogen and $n$ is an integer equal to from 1 to 6.

11. The process for preparing methylphenylchlorosilanes which comprises heating in the presence of a Friedel-Crafts type catalyst selected from the class consisting of halides of aluminum, boron, and zinc a mixture of ingredients comprising (1) benzene and (2) a mixture of methylchlorodisilanes corresponding to the general formula $Si_2Cl_n(CH_3)_{6-n}$ where $n$ is an integer equal to from 1 to 6.

12. The process for preparing phenylchlorosilanes which comprises heating at a temperature of from 300° to 600° C. in the presence of anhydrous boron trichloride a mixture of ingredients comprising (1) benzene and (2) hexachlorodisilane, and thereafter isolating the formed monomeric phenylchlorosilanes.

13. The process for making hydrocarbon-substituted halogenosilanes which comprises heating at an elevated temperature and in the presence of $SiCl_4$ and a Friedel-Crafts type catalyst selected from the class consisting of halides of aluminum, boron, and zinc, a mixture of ingredients comprising (1) a hydrocarbon and (2) a polysilane containing a silicon-bonded halogen atom and being of the type $R_{(2n+2)}Si_n$ in which $n$ has a value of at least 2 and R is selected from the group consisting of halogen atoms and hydrocarbon radicals.

14. The process for preparing phenylchlorosilanes which comprises heating at a temperature of from 300° to 600° C. in the presence of anhydrous boron trichloride, a mixture of ingredients comprising (1) benzene and (2) a chloropolysilane consisting essentially of silicon atoms and chlorine atoms, the said heating being conducted in the presence of a diluent comprising $SiCl_4$, and thereafter isolating the formed monomeric phenylchlorosilanes.

15. The process for making methylchlorosilanes which comprises heating at a temperature of from 300° to 600° C. in the presence of anhydrous boron trichloride a mixture of ingredients comprising (1) methane and (2) hexachlorodisilane.

16. The process for making cyclohexenylchlorosilanes which comprises heating at a temperature of from 300° to 600° C. in the presence of anhydrous boron trichloride a mixture of ingredients comprising (1) cyclohexene and (2) hexachlorodisilane.

17. The process for making phenylchlorosilanes which comprises heating at a temperature of from 300° to 600° C. in the presence of $SiCl_4$ as a diluent, a mixture of ingredients comprising benzene and hexachlorodisilane, the said reaction being effected in the presence of $BCl_3$ as a catalyst.

18. A process for preparing phenylchlorosilanes which comprises reacting a polysilane of the type $R_{(2n+2)}Si_n$ in which $n$ has a value of at least 2 and R is selected from the group consisting of chlorine atoms and methyl radicals there being at least one chlorine atom per silicon atom with benzene at a temperature of from 250° C. to 400° C. in the presence of aluminum chloride.

19. A process for prepaing phenylchlorosilanes which comprises reacting hexachlorodisilane with benzene at a temperature of from 250° C. to 400° C. in the presence of aluminm chloride.

20. A process for preparing phenylchlorosilanes which comprises reacting a methyl chlorodisilane, in which the silicon atoms of the disilane are substituted only with both chlorine atoms and methyl radicals, with benzene at a temperature of from 250° C. to 400° C. in the presence of aluminum chloride.

WARREN L. WALTON.

References Cited in the file of this patent

UNITED STATES PATENTS

| Number | Name | Date |
|---|---|---|
| 2,405,019 | Dalin | July 30, 1946 |
| 2,407,181 | Scott | Sept. 3, 1946 |
| 2,443,898 | Ellingboe | June 22, 1948 |
| 2,474,087 | Barry | June 21, 1949 |